United States Patent [19]

Manzoni

[11] 4,277,140
[45] Jul. 7, 1981

[54] VEHICLE REARVIEW MIRRORS

[76] Inventor: Stephane Manzoni, 1, rue Pasteur, Saint Claude, France, 39200

[21] Appl. No.: 130,101

[22] Filed: Mar. 13, 1980

[30] Foreign Application Priority Data

Mar. 23, 1979 [FR] France ............................ 79 07429

[51] Int. Cl.³ ........................... G02B 5/08; B60R 1/02
[52] U.S. Cl. ..................................... 350/288; 248/487
[58] Field of Search ...................... 350/288, 289, 307; 74/501 M; 248/479, 481-487

[56] References Cited

U.S. PATENT DOCUMENTS

| 2,855,825 | 10/1958 | Feder .............................. 74/501 M |
| 3,064,536 | 11/1962 | Weingartner . |
| 3,370,480 | 2/1968 | Gionet et al. .................... 74/501 M |
| 3,659,477 | 5/1972 | Wehner ........................... 74/501 M |
| 4,171,873 | 10/1979 | Repay et al. ..................... 248/479 |

FOREIGN PATENT DOCUMENTS

| 1966669 | 6/1974 | Fed. Rep. of Germany . |
| 2708328 | 7/1979 | Fed. Rep. of Germany . |
| 2136229 | 12/1972 | France . |
| 2225313 | 11/1974 | France . |
| 2271077 | 12/1975 | France . |
| 2349474 | 11/1977 | France . |
| 2356198 | 1/1978 | France . |

Primary Examiner—F. L. Evans
Attorney, Agent, or Firm—Lewis H. Eslinger

[57] ABSTRACT

An improvement to vehicle rearview mirrors, comprising a mirror fitted on a support member pivotally mounted in the center of the back of a casing.

At the back of the mirror-supporting member is fitted at least one elastic member, the two ends of which are resting against the opposed side faces of the casing, the said elastic member being engaged in at least two guiding members fast with the mirror-supporting member.

The invention finds an application in remotely-adjustable rearview mirrors.

7 Claims, 8 Drawing Figures

VEHICLE REARVIEW MIRRORS

The present invention relates to an improvement to vehicle rearview mirrors.

Rearview mirrors which consist of mirrors moving at an angle inside their support casing and are adjustable from outside or inside the vehicle, have a disadvantage which is that the mirror being subjected to stray vibrations, gives a blurred, "shaky" image which prevents correct vision.

To eliminate this defect, devices have been proposed in French Patent No. 75.15252, German Patent Application No. 2 426 489 and U.S. Pat. No. 2,855,825. Such devices for eliminating vibrations normally comprise elastic members placed between the mirrorholder and the casing. These anti-vibratory members are constituted either by force-twisted pins or by blades working in compression and friction.

Each anti-vibratory member is composed of a flexible element adapted to come in sliding contact on the inside face of the cupel and of another element fitted on the back of the mirror supporting member. The flexible element of support forms an angle of approximately 90° with the other fixed element fitted on the back face of the mirror supporting member.

However, these known means do not completely eliminate vibrations if the flexible elements (pins, blades) are not subjected to the adequate stress.

In order to respect the rules set by the control organizations relatively to the elimination of mirror vibrations, which rules are becoming more and more severe, it is necessary to increase the operating torque of the mirror-supporting member by increasing the twisting or the resting force of the elements in contact with the casing.

Consequently, the operating torque, particularly in rearview mirrors controlled by a cable transmission, becomes too high, creating difficulties of operation and of adjustment which can entail risks of cable breakage at the level of the control knob.

In addition, the flexible elements of the known type form an angle of approximately 90° with the rear face of the mirror-supporting member, thereby preventing their fitting in casings of small depth. By coming into abutment against the closed section of the rear wall of the casing, the end-of-travel deflections of the mirror supporting member can indeed become perturbed therewith.

In the known anti-vibratory devices, therefore, it is necessary for the flexible elements to be effective, that said elements be fitted under a very strong twisting and compression force, this entailing disadvantages and difficulties in cable control transmission. Moreover the flexible elements need a very deep fitting space which reduces the possibilities of angular deflection for the mirror.

In order to overcome these disadvantages, the present invention proposes an improved device which eliminates the direct stress method in the connection between the casing and the mirror supporting member.

According to the present invention, at least one elastic member is mounted on the back of the mirror-supporting member, the two ends of the said elastic member resting against the opposed side faces of the casing, and the said elastic member being engaged in at least two guiding members fast with the mirror-supporting member.

With this arrangement, the mirror-supporting member is slightly restrained and positioned without direct pressure, so that all vibrations are suppressed.

Moreover, this device further permits a smooth mirror-adjusting operation by the control member and a reduced depth of space for the antivibratory device fitted on the back face of the mirror-supporting member.

In order to improve the guiding of the mirror casing a connection is made between these two members by way of a guiding member which is fast with the mirror-holder, in prolongation of one or two orthogonal axes of the joint thereof, the said guiding member sliding in at least one groove situated on the inside wall of the casing.

The invention will be more readily understood on reading the following description of several embodiments with reference to the accompanying drawings, in which.

Figure 1:
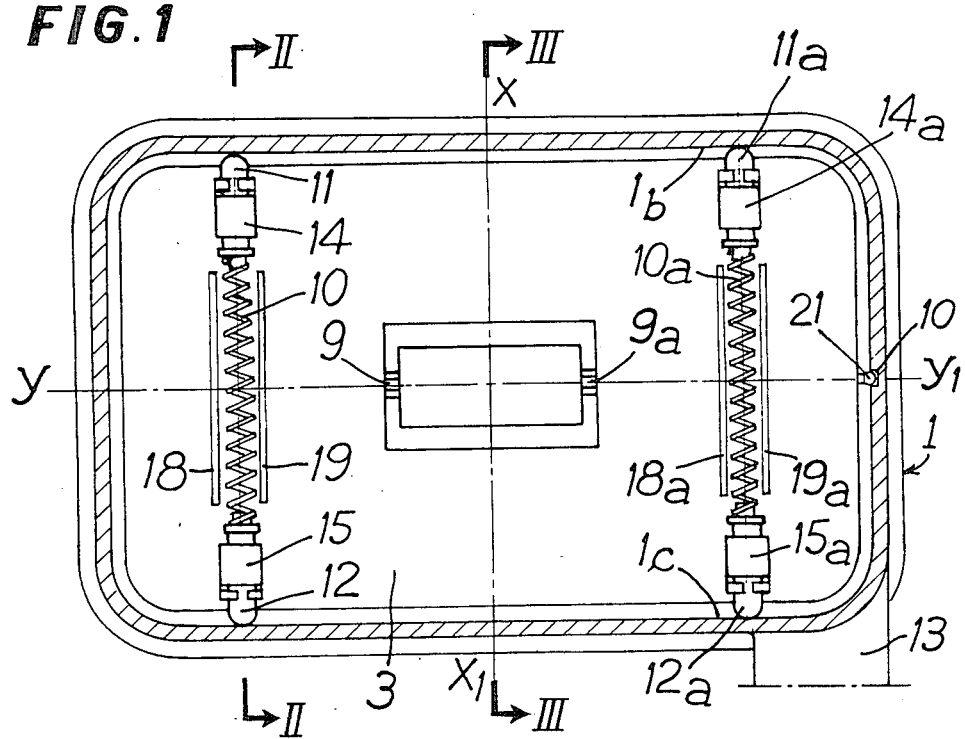
FIG. 1 is an elevational cross-section, along line I—I of FIG. 2, of an embodiment of improved rearview mirror according to the invention.
Figure 2:
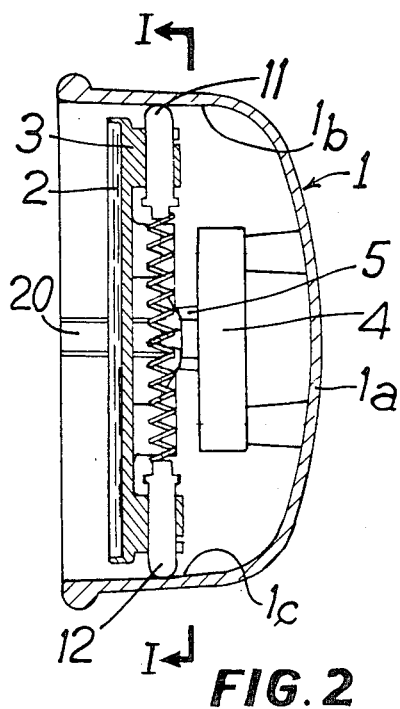
FIG. 2 is a cross-section along line II—II of FIG. 1.
Figure 3:
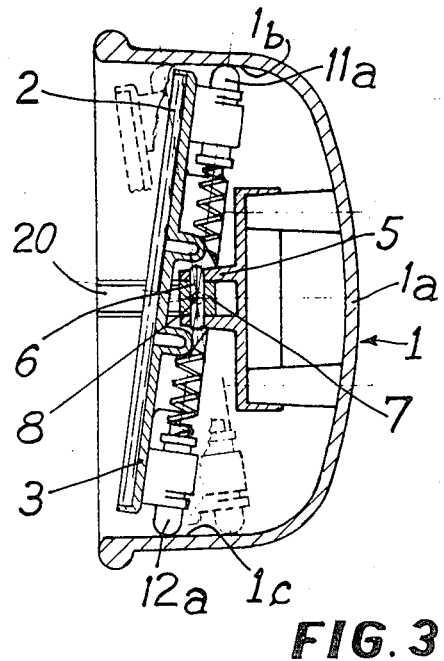
FIG. 3 is a cross-section along line III—III of FIG. 1.

FIGS. 1, 2 and 3 show a rearview mirror comprising a casing 1, mounted on an arm 13 connected to the vehicle body, said casing 1 containing a mirror 2 secured to a supporting member 3 adapted to be moved according to two perpendicular axes $xx_1$ and $yy_1$ via a control means not shown on the drawing.

On the back 1a of the casing 1 is fitted or molded a supporting member 4 provided with a fork 5 in which is fitted a vertical axis 6 on which axis is pivotally mounted a crosspiece 7 provided at its ends with trunnions 8 mounted for pivoting in bearings 9, 9a fast with the rear face of the mirrorsupporting member 3. It is possible with this design to move the supporting member 3 along two perpendicular axes $xx_1$ and $yy_1$. Two elastic members consisting of helical springs 10, 10a are situated symmetrically on either side of the vertical axis $xx_1$, said helical springs being respectively in resting contact at their two ends, via two push-buttons 11, 12 and 11a, 12a on the opposed sides faces 1b and 1c of the casing 1.

Figure 4:
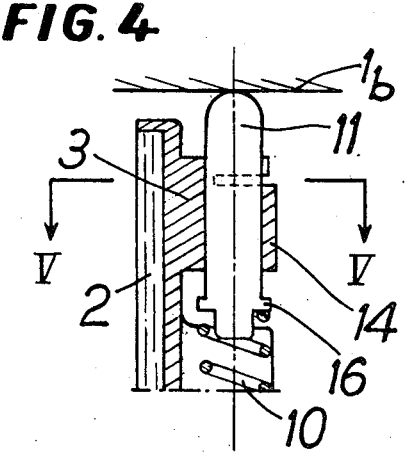
FIG. 4 is a view on an enlarged scale of a push button mounted in a guide bearing.
Figure 5:
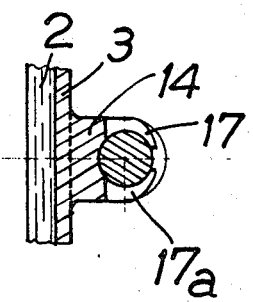
FIG. 5 is a cross-section along line V—V of FIG. 4.
Figure 6:
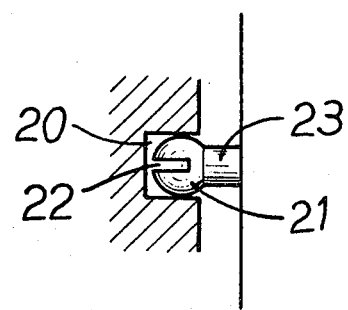
FIG. 6 is a cross-section of an embodiment detail of FIG. 1 showing a guide member.

Each push-button 11, 12 and 11a and 12a is mounted for free sliding in a bearing 14, 15, 14a, 15a which is fast with the back face of the mirror-supporting member 3 (FIGS. 4,5). The push button 11 is provided with a flange 16 against which rests one of the ends of the spring 10.

Above each bearing such as 14, there is provided two lips 17, 17a made of elastic material, which are in radial contact with the push button 11 in order to constitute a gripping member for the latter and to remove any radial clearance if necessary.

On either sides of each spring 10 and 10a are situated two blades 18, 19 and 18a and 19a, which are fast with the mirror-supporting member 3 and ensure the lengthwise guiding of the springs.

On one of the side edges of the casing 1, level with its horizontal median plane, is provided a groove 20 (FIGS. 1, 2, 4 and 6) inside which a spherical-shaped lug 21 slides and pivots, which lug is provided with a split 22 and is connected via a rod 23 to the mirror supporting member 3. It is possible with this design to reinforce the support of the mirror 2 due to the lug being arranged according to the pivoting axis $yy_1$ in order to allow the "North-South" angular deflection.

In the embodiment shown in FIGS. 1, 2 and 3, the elastic member 10, 10a exercises a low and virtually constant thrusting force in all the deflections permitted by the mechanism.

Figure 7:
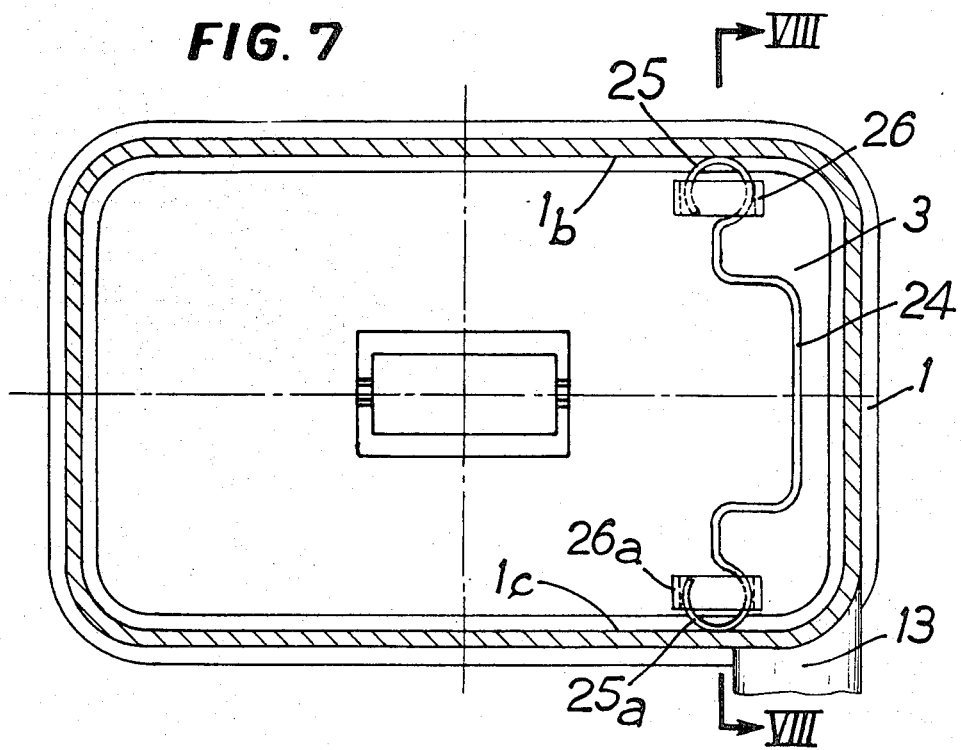
FIG. 7 is a cross-section along line VII—VII of FIG. 8 in another embodiment of the improved rearview mirror according to the invention.
Figure 8:
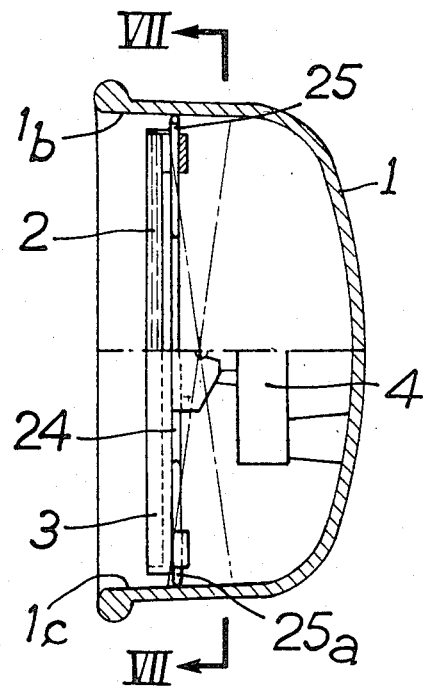
FIG. 8 is a cross-section along line VIII—VIII of FIG. 7.

FIGS. 7 and 8 show a variant embodiment in which the elastic member is constituted by a spring 24 made of resilient wire such as steel wire and provided with an $\Omega$-shaped central part and two loops 25, 25a at the ends, which loops are in forced contact with the opposed faces 1b and 1c of the casing 1.

The end loops 25, 25a are mounted for free sliding in guides 26, 26a provided on the back face and on the opposed edges of the mirror-supporting member 3.

Various modifications may of course be made by anyone skilled in the art to the methods or devices described hereinabove without departing from the scope of the invention.

What is claimed is:

1. An improvement to vehicle rearview mirrors, comprising a mirror fitted on a support member pivotally mounted in the central part of the base of a casing, wherein at the back of the mirror-supporting member is mounted at least one resilient member whose axis is situated in a plane parallel to the plane of the mirror and whose two ends are resting against the opposed side faces of the casing, said resilient member being engaged in at least two guide members fast with the mirror-supporting member.

2. An improvement to rearview mirrors as claimed in claim 1, wherein two helical springs are mounted on the back face of the mirror supporting member on either sides of the vertical axis of the rearview mirror, the ends of which springs are resting against two push buttons mounted to slide freely in two bearings provided on the opposite sides of the mirror supporting member, the said push buttons being in contact with the opposed side faces of the casing, under the action of the spring.

3. An improvement to rearview mirrors as claimed in claim 2, wherein the bearings in which are mounted the push buttons are each provided with at least one gripping member consisting of two lips coming radially and resiliently in contact with the push button.

4. An improvement to rearview mirrors as claimed in claim 2, wherein the helical spring is situated between two blades guiding lengthwise the back face of the mirror-supporting member.

5. An improvement to rearview mirrors as claimed in claim 1, wherein the elastic member is constituted of an elastic wire provided with an $\Omega$-shaped central part and two loops at the ends which loops are in resting contact on the opposed side faces of the casing, the said loops being mounted to slide freely in the guides provided on the two opposed edges of the back face of the mirror-supporting member.

6. An improvement to rearview mirrors as claimed in any one of claims 1 to 5, wherein the casing comprises on the inside along the horizontal axis a groove in which a lug is mounted for sliding and for pivoting, which lug is fast with one of the sides of the mirror supporting member.

7. An improvement to rearview mirrors as claimed in claim 6 wherein the lug consists of a resiliently deformable sphere provided with a split.

* * * * *